United States Patent [19]
Rhodes

[11] 3,749,378
[45] July 31, 1973

[54] PRODUCING A FOAMED LIQUID

[75] Inventor: David Rhodes, Banbury, Broughton Park, England

[73] Assignee: General Foods Limited, Banbury, Oxon, England

[22] Filed: May 28, 1971

[21] Appl. No.: 147,923

[52] U.S. Cl.. 261/78 A, 261/DIG. 26, 261/DIG. 75, 99/71
[51] Int. Cl............................................. B01f 3/04
[58] Field of Search.............. 261/DIG. 26, DIG. 75, 261/123, 76, 78 A; 99/71; 425/4, 4 C

[56] References Cited
UNITED STATES PATENTS

| | | | |
|---|---|---|---|
| 1,927,376 | 9/1933 | Schroder et al. | 261/DIG. 26 |
| 2,788,276 | 4/1957 | Reich et al. | 99/71 |
| 3,620,306 | 11/1971 | Shepherd | 261/DIG. 26 |
| 3,388,868 | 6/1968 | Watson et al. | 261/DIG. 26 |
| 2,183,561 | 12/1939 | Hamblin | 261/76 |
| 2,976,158 | 3/1961 | Morgan, Jr. et al. | 99/71 X |

FOREIGN PATENTS OR APPLICATIONS 1,102,587 2/1968 Great Britain .......................... 99/71

Primary Examiner—Frank W. Lutter
Assistant Examiner—William L. Mentlik
Attorney—Bruno P. Struzzi, Thomas V. Sullivan and Gerald E. Jacobs

[57] ABSTRACT

An apparatus for foaming liquids such as coffee extract, tea extract, juices and mixes of emulsions capable of controlling the fineness and density of the foamed liquid consisting of a mixing zone in which gas is introduced into the liquid under pressure and a second zone containing a plurality of spaced, flat annular plates which define numerous paths through which the foam must pass. The foamed liquid may be dried by freeze drying or spray drying. The apparatus is particularly useful in a process for producing a spray dried product.

2 Claims, 2 Drawing Figures

PRODUCING A FOAMED LIQUID

BACKGROUND OF THE INVENTION

This invention relates to a mixing device and more particularly to a gas injection mixing device for producing a fine foam under controlled conditions. The invention is also concerned with a process and apparatus for producing a foam spray-dried soluble coffee product, especially of a very low bulk density. The process and apparatus may also be used for the production of other foam spray-dried products, such as soluble tea dried emulsions (e.g. for topping mixes) and fruit juices. The apparatus can be used to foam a concentrated coffee extract prior to freeze drying or spray drying.

The process of foaming extracts prior to spray-drying may be useful where difficulties from wall adhesion by inherently sticky products and otherwise poorly flowable products are often encountered. Low bulk density coffee powders (i.e. powders having a bulk density lower than normally capable of being produced by spray-drying) are important as products by virtue of their attractive appearance, and free flowing properties and are of a special value in agglomeration processes as a method of preventing an undesirable high density agglomerate.

It is known that low density spray-dried coffee powders may be produced by dispersing a gas in an aqueous coffee extract to produce a foam prior to the spray-drying. In U. S. Pat. No. 2,788,276 a process is disclosed involving the introduction of a controlled flow of gas, for example carbon dioxide, into a coffee extract under pressure to form a foam, raising the pressure with a booster pump and feeding the foam into a high-pressure reciprocating pump where the foam is compressed to a still higher pressure for spray-drying. The foam before spray-drying has a density in the range from 0.05 to 1.0 g./ml. measured at atmospheric pressure. The specification does not disclose how the stated foam density is measured in practice, following the release of extract with the gas from a high pressure situation, although it may be assessed theoretically at any given pressure by consideration of the amounts of gas and extract involved. Also, the process disclosed in U.S. Specification No. 2,788,276 is only suitable where spraying pressures of a high order, viz. 4000 psig, are involved and required. Such high pressures are used, particularly with high concentration extracts, when very high density instant coffee (i.e. 0.40 g./ml.) are made without gas, through nozzles having a small orifice diameter.

Much lower spraying pressures are now generally adopted for spray-dried coffee extracts in towers of considerable height to accommodate the larger sized particles produced. Typically 100 to 500 psig. for coffee extracts of 20 to 30 percent concentration are used, though somewhat higher pressures may be necessary for concentrated extracts.

Simple methods for generating a foam, such as injecting the gas into a stream of extract through a single or even a number or orifices, are not satisfactory since such coarsely made foam can separate within the conveying pipe, interfering with the even discharge of the foam from a spray nozzle of conventional whirlchamber type used at relatively low pressures. The resulting intermittent slugs of gas emerging from the nozzle, rather than a uniform foam, alters the normal spraying angle of the nozzle so that poor use is made of the spray-drier chamber dimensions. One way of overcoming this latter disadvantage is to use solid cone spray nozzles. Although such nozzles are preferred in order to maintain a good spray pattern, it has been found that they are not essential when the device of the present invention is employed.

It has now been found that the above-mentioned disadvantages may be overcome by utilizing the mixing device of the present invention. This device is a specially designed gas injecting and dispersing device which enables a high ratio of gas/extract to be sustained while allowing the subsequent uniform and regular spraying from a nozzle into a spray-drier chamber. By this means, injected gas to form the foam is more efficiently used and dispersed through the liquid extract and a very low bulk density foam spray-dried soluble coffee product may be obtained.

SUMMARY OF THE INVENTION

According to the present invention there is provided a mixing device for producing a fine foam which comprises an inlet for gas and an inlet for liquid, leading into a mixing zone; the mixing zone is connected to a second zone containing a plurality of spaced plates which form numerous narrow paths through which the coarse foam passes. The foamed liquid is discharged through the outlet of the second zone as a fine foam.

The inlet for the gas preferably contains a gas injection device for introducing the gas into the mixing zone in a plurality of fine streams to ensure satisfactory dispersion of the gas within the incoming liquid to produce a course foam. A preferred injection device comprises a diffuser injection ring containing a plurality of fine holes as illustrated in FIG. 1.

The flat plates used in the device of this invention for providing the fine foam are preferably thin annular plates made from a corrosion-resistant metal. The size and capacity of the device may be varied within wide limits depending upon the particular application and the size of the installation within which it is to be used. A great advantage of the device is that it contains no moving parts and by altering the number, thickness and/or spacing of the plates and carefully controlling the rate of flow of gas and liquid extract and the pressure thereof, a foam of any desired fineness and density may be obtained for spray drying. Another advantage is that the device of this invention may be easily installed in an existing plant without any major or expensive alterations to pipe work or other apparatus.

The present invention also provides a process for producing a foam composition which comprises dispersing a gas in an aqueous extract or emulsion of the desired product in a device as hereinbefore described and drying the resulting fine foam by known techniques such as spray-drying, freeze-drying, etc.

A preferred embodiment of the process is for producing a soluble coffee composition which comprises dispersing a gas in an aqueous coffee extract in a device as hereinbefore described and drying the resulting fine foam. The process may also be used to prepare foamed products from other extracts, such as tea or fruit juices, or emulsions such as those used for topping compositions.

The gas used in the process may be any gas which does not interact with the extract or emulsion and suitable examples are nitrogen, carbon dioxide and nitrous oxide. The preferred gas is nitrogen. Carbon dioxide does not give the same low bulk density products at the same initial foam density as nitrogen.

By virtue of the fine dispersion of gas provided by the device of this invention, the process of this invention produces spray-dried powder of low bulk density wherein small gas bubbles are entrapped within the walls of the spray-dried particles as can be seen by examining them under the microscope. Using a fixed rate of extract flow and spray-drying conditions, the quantity and type of gas used in the process determines the final bulk density of the spray-dried product, which may therefore be adjusted as desired.

When using nitrogen, the process described above is capable of producing foamed coffee extract having a foam density, calculated at atmospheric pressure, of 0.033 g/cc. and lower. These foams when spray-dried can give products of free-flow bulk density of less than 0.08 g/cc. While it is true that the amount of gas to provide a foam having a density of 0.033 could be injected coarsely into an extract without using the device of this invention, such extract would not necessarily be capable of being spray-dried, owing to "jetting" or spluttering at the nozzle and would certainly not give a product having such a low free-flow bulk density.

Agglomeration is being used as a technique to form spray-dried particles into larger agglomerates which are attractive to the consumer. A disadvantage of agglomeration is that the bulk density of the product tends to increase. The foamed particles of this invention are advantageously used in an agglomeration process to achieve a lower density agglomerated product.

Also, it is often advantageous to dry an extract (e.g. coffee extract) in a concentrated form as a means of reducing the overall cost of an expensive process such as freeze drying. Concentrated extracts result in a dry product of high density as compared to products prepared from more dilute extracts. The apparatus of this invention can be used to foam a concentrated extract as a means of lowering the density of the product obtained when drying concentrated extracts. Thus, concentrated coffee extract having solids content of about 35 to 60 percent solids by weight of the extract can be foamed in the apparatus of this invention and the foamed extract can be frozen, subdivided into particulate pieces and vacuum freeze-dried.

DESCRIPTION OF THE PREFERRED EMBODIMENT

Figure 1:
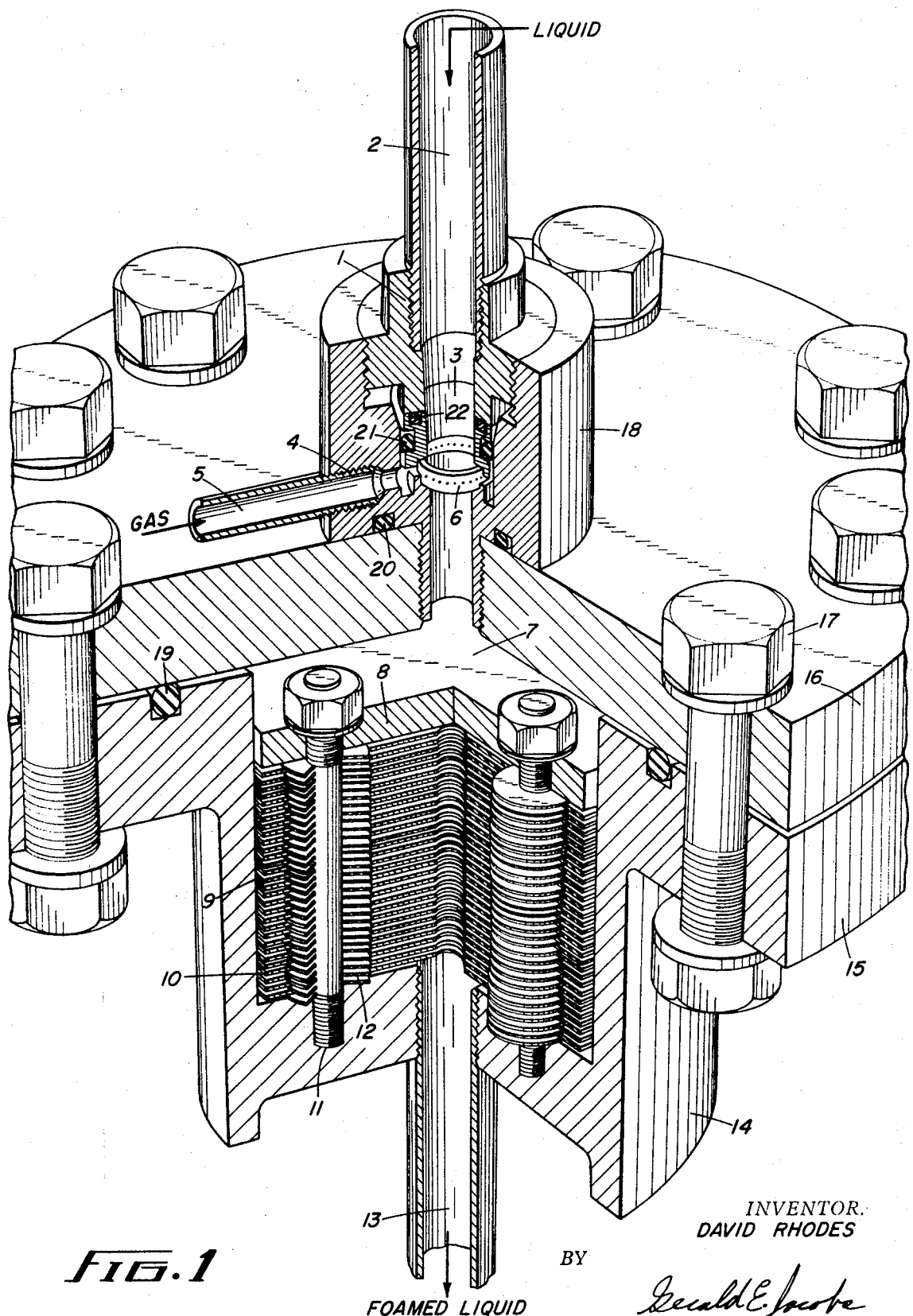
FIG. 1 is a perspective view of a preferred device according to the invention.

The device illustrated in FIG. 1 comprises an inlet 1 adapted to receive a pipe 2 for introducing liquid extract into a mixing zone 3. A second inlet 4 is adapted to receive a pipe 5 for introducing the gas for foaming. The gas is injected into the mixing zone through an injector ring 6 which contains a plurality of fine holes.

The injection of the gas into the liquid extract produces a coarse foam in the mixing zone and this foam is passed under pressure into a second zone 7 wherein it is deflected by a circular top plate 8 into and through the annular space between the wall of the zone 9 and a plurality of flat annular plates 10. The annular plates are mounted on studs 11 and spaced apart by washers 12. By virtue of the pressure drop between the inlet and outlet of the device, the course foam is directed through the narrow spaces between the annular plates resulting in efficient dispersion of the gas throughout the liquid to produce a fine foam which is ejected through the outlet pipe 13.

In the preferred embodiment as illustrated in FIG. 1 the second zone is designed by a body portion 14 having a flange 15 through which it is bolted to a plate 16 by a plurality of bolts 17. The mixing zone is defined by a hollow cylinder 18 mounted on the plate 16 and sealing of the various zones is ensured by O-sealing rings 19, 20, 21 and 22.

By appropriate spacing of the annular plates it is possible to increase or decrease the liquid pressure drop over the device and thus adjust the shear and dispersion of the gas. The preferred number of plates, plate thickness and spacing for a particular product may be readily determined in a few trail runs.

Figure 2:
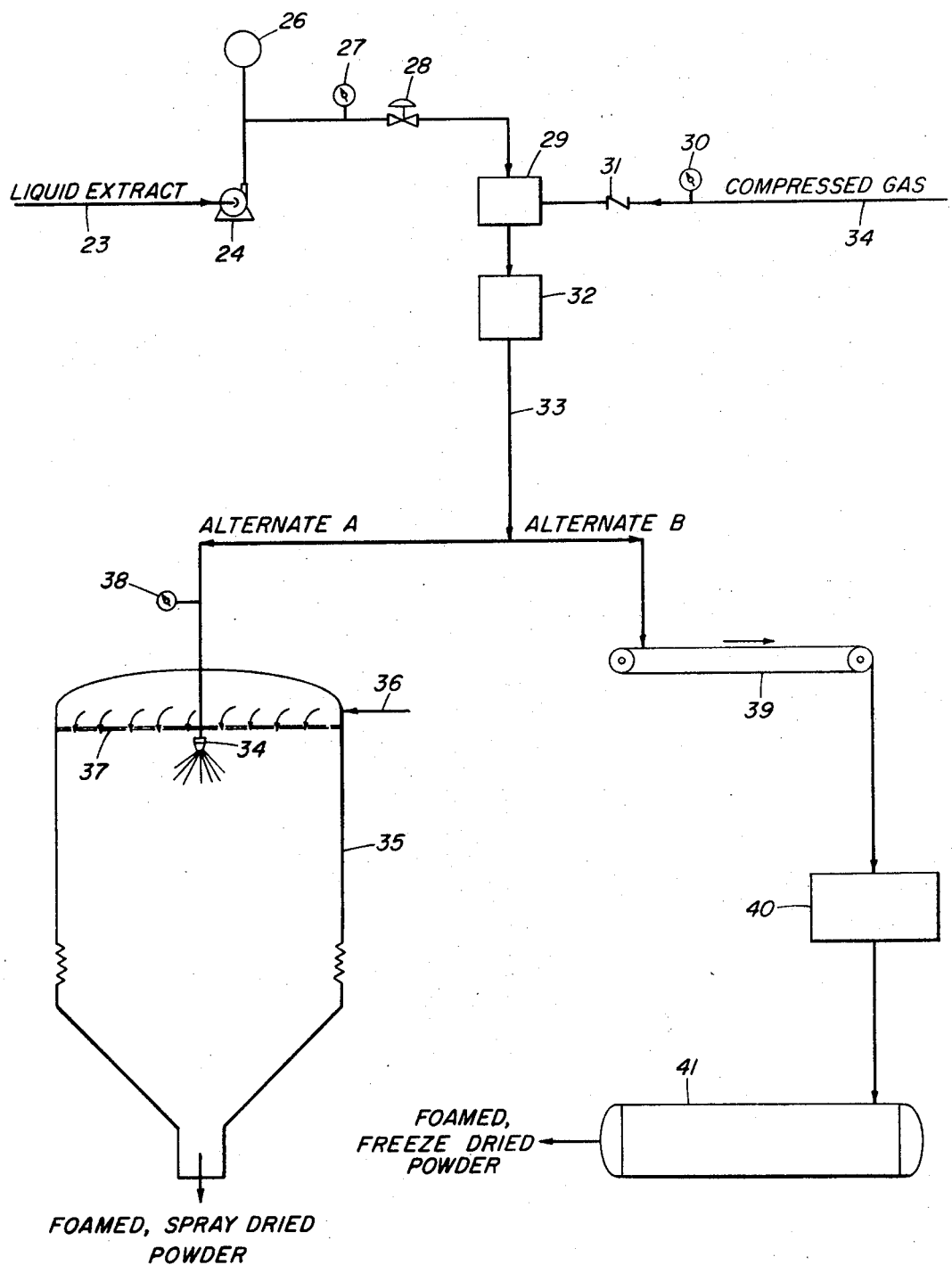
FIG. 2 is a schematic flow diagram illustrating a plant for performing the process of the invention.

A suitable plant for producing a foamed coffee powder according to the process of the invention is illustrated schematically in FIG. 2. In this plant an aqueous coffee extract is introduced through pipe 23 and the gas for foaming is introduced, for example from a cylinder, through a pipe 24. The aqueous coffee extract is passed through a feed pump 25 into a high pressure line where the pressure of the liquid extract is smoothed with the aid of a surge accumulator 26. A pressure gauge 27 is used to minitor the pressure of the extract in the high pressure line. The extract is passed through a control valve 28 into a gas injection mixing device 29. The rate of flow of the gas which is injected into the mixing device is controlled with the aid of a pressure gauge 30 and a non-return valve 31 mounted in the gas inlet pipe. In the second zone of the apparatus of this invention 32 the gas is dispersed in the liquid extract to produce a fine foam which is passed through pipe 33 for further processing via Alternate A or Alternate B.

In Alternate A, the fine foam is fed to a standard centrifugal spray nozzle 34 within a spray tower 35 where the foamed extract is dried with hot air entering through line 36 and distribution plate 37. An additional pressure gauge 38 is positioned close to the nozzle to give the spraying pressure.

In Alternate B, the fine foam extract is frozen on a continuous freezing belt 39 and the frozen extract is subdivided into particulate pieces in grinder 40. The ground, frozen extract is vacuum freeze dried in drier 41.

The following Example illustrates the process of the invention and the manner in which it may be performed for the production of a soluble coffee product.

EXAMPLE

A coffee extract of 20.1 percent solids concentration by weight of the extract was fed at a temperature of 120°F. at approximately 36 gallons/hr. from a feed pump through a gas foaming device as described above. The foamed extract then passed through the delivery line immediately and directly to the spray nozzles of a conventional spray-drier, fitted for collection of spray-dried product.

Under steady conditions of foaming and making foam spray-dried powder, the total pressure at the feed pump was 220 psig. The gas used for foaming (nitrogen) was injected against this pressure of 220 psig. and at a rate of 13 lbs./hr. The foaming device was fitted with 30 plates, each having a thickness of 0.031 inch, and a diameter of 3.75 inches spaced 0.010 inch apart, under which conditions the extract pressure drop across the device was 10 psig. to give a pressure at the nozzle of 210 psig. The degree of foaming corresponds to a theoretical density of 0.33 grs. per cc. foamed extract, or 0.03 grs. per cc. calculated at atmospheric pressure.

This foamed extract entering the spray nozzle into the spray drier was dried at an inlet air temperature of 560°F. and outlet temperature of 260°F. These conditions gave a spray-dried product of free flow bulk density of 0.052 grs. per cc. and of good flowability, and very light color.

This product may be compared with spray-drying the same extract without any gas injection in the same spray drier under similar conditions, when a product of bulk density of 0.178 grs. per cc. was obtained. The two products may be compared.

|  | Free flow bulk density (grs. per cc) | Powder color (lumetron units) | Particle size distribution br. standard mesh | | | | | |
|---|---|---|---|---|---|---|---|---|
|  |  |  | On 22 | On 36 | On 52 | On 60 | On 85 | Thru 85 |
| Without foaming | 0.178 | 35 | 12.6 | 16.0 | 18.0 | 17.6 | 25.2 | 10.0 |
| With foaming (nitrogen gas) | 0.052 | 60 | 38.0 | 29.9 | 14.2 | 5.5 | 3.7 | 8.7 |

The foamed spray-dried product may be subjected to an agglomeration step wherein the color would be somewhat darkened. The agglomerated powder will have a density significantly lower than that obtained when agglomerating the unfoamed powder.

The foregoing example was for illustrative purposes only and the invention is intended to be limited by the appended claims.

What is claimed is:

1. An apparatus for foaming aqueous solutions and emulsions comprising a mixing zone, means for introducing a liquid and a gas into said mixing zone under pressure, thus forming a coarse foamed liquid; means for passing said coarse foamed liquid into a second zone under pressure wherein the coarse foamed liquid is converted into a finer foamed liquid with uniformly dispersed gas bubbles; said second zone having flat, spaced plates and means for directing the coarse foamed liquid through the spaces between the plates, the plates in said second zone being annular and having a thickness of from 0.01 to 0.1 inches and the space between said plates being from 0.005 to 0.1 inches; and means for discharging the finer foamed liquid from said second zone.

2. The apparatus of claim 1 wherein the gas is introduced into the mixing zone through openings in a dispersion ring, said dispersion ring being a perforated plate shaped to form part of the wall of said mixing zone.

* * * * *